(12) United States Patent
Takada et al.

(10) Patent No.: US 9,250,103 B2
(45) Date of Patent: Feb. 2, 2016

(54) OPTICAL ROTARY ENCODER WITH CORRECTION METHOD REDUCING VARIATION OF A DISTANCE BETWEEN A ROTATION BODY AND A LIGHT RECEIVING UNIT

(71) Applicant: FUJITSU LIMITED, Kawasaki-shi, Kanagawa (JP)

(72) Inventors: Eiji Takada, Kawasaki (JP); Taizan Kobayashi, Kawasaki (JP); Katsuki Shirai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 418 days.

(21) Appl. No.: 13/957,645

(22) Filed: Aug. 2, 2013

(65) Prior Publication Data
US 2014/0042308 A1 Feb. 13, 2014

(30) Foreign Application Priority Data
Aug. 7, 2012 (JP) ................................ 2012-175292

(51) Int. Cl.
*G01D 5/34* (2006.01)
*G01D 5/347* (2006.01)
*G01D 5/244* (2006.01)

(52) U.S. Cl.
CPC ............ *G01D 5/3473* (2013.01); *G01D 5/2448* (2013.01); *G01D 5/34707* (2013.01)

(58) Field of Classification Search
CPC ............ G01D 5/34707; G01D 5/2448; G01D 5/3473; G01D 5/34715; G01D 5/347; G01D 5/24466
USPC ............. 250/231.16, 231.14, 231.13, 231.12, 250/231.1, 206.1, 221; 341/13, 11; 33/1 PT, 33/1 L, 1 M, 1 N; 356/616, 615, 617, 618, 356/620, 622
See application file for complete search history.

(56) References Cited

U.S. PATENT DOCUMENTS

| | | | | |
|---|---|---|---|---|
| 6,424,407 | B1 * | 7/2002 | Kinrot | G01D 5/347 345/166 |
| 6,639,207 | B2 * | 10/2003 | Yamamoto | G01D 5/3473 250/231.13 |

(Continued)

FOREIGN PATENT DOCUMENTS

| | | |
|---|---|---|
| JP | 2001-264119 A | 9/2001 |
| JP | 2004-109074 A | 4/2004 |

(Continued)

*Primary Examiner* — Que T Le
*Assistant Examiner* — Jeennifer Bennett
(74) *Attorney, Agent, or Firm* — Squire Patton Boggs (US) LLP (57) ABSTRACT

An optical rotary encoder includes a light source, a rotation body including a reflecting diffraction grating, a light receiving unit including a plurality of light receiving elements, a synthetic unit that combines output signals output from the plurality of light receiving elements to obtain a signal, which represents a fringe pattern component at a certain cycle, included in a light reflected by the reflecting diffraction grating and, and a detection unit that detects a direction based on a first signal and a second signal, the direction being a direction in which a distance between the rotation body and the light receiving unit varies, the first signal and the second signal being obtained by the synthetic unit, the first signal indicating a fringe pattern component having a cycle shorter than the certain cycle, the second signal indicating a fringe pattern component having a cycle longer than the certain cycle.

6 Claims, 7 Drawing Sheets

(56) References Cited

U.S. PATENT DOCUMENTS

| | | |
|---|---|---|
| 7,060,969 B2 | 6/2006 | Uchiyama et al. |
| 7,958,620 B2 | 6/2011 | Henshaw |
| 2010/0079767 A1* | 4/2010 | Ishizuka .................. G01D 5/38 356/482 |

FOREIGN PATENT DOCUMENTS

| | | |
|---|---|---|
| JP | 2005-168280 A | 6/2005 |
| JP | 2008-539407 A | 11/2008 |
| WO | WO 2006/114602 A1 | 11/2006 |

\* cited by examiner

[A] PHOTODIODE ARRAY

| A | B | C | D | E | F | G | H | I | J | K | L | M | N | O | P | Q | R | S | T | U | V | W | X |

[B] DENSE INTERVAL

| A | B | C | D | E | F | G | H | I | J | K | L | M | N | O | P | Q | R | S | T | U | V | W | X |

$S_{sine} = (A+B)-(C+D)+(E+F)-(G+H)+(I+J)-(K+L)+(M+N)-(O+P)+(Q+R)-(S+T)+(U+V)-(W+X)$

| A | B | C | D | E | F | G | H | I | J | K | L | M | N | O | P | Q | R | S | T | U | V | W | X |

$S_{cosine} = (B+C)-(D+E)+(F+G)-(H+I)+(J+K)-(L+M)+(N+O)-(P+Q)+(R+S)-(T+U)+(V+W)-(X+A)$

[C] STANDARD INTERVAL

| A | B | C | D | E | F | G | H | I | J | K | L | M | N | O | P | Q | R | S | T | U | V | W | X |

$S_{sine} = (A+B+C+D)-(E+F+G+H)+(I+J+K+L)-(M+N+O+P)+(Q+R+S+T)-(U+V+W+X)$

| A | B | C | D | E | F | G | H | I | J | K | L | M | N | O | P | Q | R | S | T | U | V | W | X |

$S_{cosine} = (C+D+E+F)-(G+H+I+J)+(K+L+M+N)-(O+P+Q+R)+(S+T+U+V)-(W+X+A+B)$

[D] LOOSE INTERVAL

| A | B | C | D | E | F | G | H | I | J | K | L | M | N | O | P | Q | R | S | T | U | V | W | X |

$S_{sine} = (A+B+C+D+E+F)-(G+H+I+J+K+L)+(M+N+O+P+Q+R)-(S+T+U+V+W+X)$

| A | B | C | D | E | F | G | H | I | J | K | L | M | N | O | P | Q | R | S | T | U | V | W | X |

$S_{cosine} = (D+E+F+G+H+I)-(J+K+L+M+N+O)+(P+Q+R+S+T+U)-(V+W+X+A+B+C)$

FIG. 7

OPTICAL ROTARY ENCODER WITH CORRECTION METHOD REDUCING VARIATION OF A DISTANCE BETWEEN A ROTATION BODY AND A LIGHT RECEIVING UNIT

CROSS-REFERENCE TO RELATED APPLICATION

This application is based upon and claims the benefit of priority from the prior Japanese Patent Application No. 2012-175292 filed on Aug. 7, 2012, the entire contents of which are incorporated herein by reference.

FIELD

The embodiments discussed herein are related to a technology of an optical rotary encoder.

BACKGROUND

There are some known technologies that are related to an optical rotary encoder. For example, a technology is known by which a rotation speed and rotation angle of a detection target in which a member to be detected is installed is highly accurately detected. In such a technology, first, three rotation sensors that are arranged at 90° intervals in the circumferential direction of a disc-like code wheel attached to an output shaft of a motor individually output signals that correspond to a rotation speed of the code wheel. An error component of one cycle (one-cycle component) occurs per rotation when the code wheel is eccentric to the output shaft, and an error component of two cycles (two-cycle component) occurs per rotation when the code wheel is deformed into an oval shape. Here, subtraction or addition is performed on a correction signal that is obtained by removing the two-cycle component by averaging outputs of a first rotation sensor and a second rotation sensor and a correction signal that is obtained by removing the two-cycle component by obtaining a difference between outputs of the first rotation sensor and a third rotation sensor, in accordance with a phase and amplitude of the remaining one-cycle component. As described above, in such a technology, both of the error component of one-cycle per rotation and the error component of two-cycle per rotation are removed by one rotation of the member to be detected (see, for example, Japanese Laid-open Patent Publication No. 2005-168280).

In addition, a technology of a rotary encoder is known by which an eccentricity amount may be appropriately corrected even if eccentricity of a disk varies for each rotation. In such a technology, the rotary encoder includes a rotation disk, a main sensor, and an auxiliary sensor. Here, the rotation disk has a main slit pattern that is used to detect a rotation angle of the rotation disk and a plurality of concentric auxiliary slit patterns that are used to detect eccentricity of the rotation disk. The main sensor reads the main slit pattern. In addition, the auxiliary sensor is arranged at a position of 90° with respect to the main sensor and detects the auxiliary slit pattern. In such a technology, an angle detection signal of the main sensor is corrected using a signal from the auxiliary sensor (see, for example, Japanese Laid-open Patent Publication No. 2001-264119).

In addition, a technology of an optical encoder is known by which a measurement error due to eccentricity of a pulse plate is minimized with a configuration at low cost. In such a technology, a slit pattern of the pulse plate is formed so as to generate an angle (for example, 45°) with respect to the traveling direction of the pulse plate (see, for example, Japanese Laid-open Patent Publication No. 2004-109074).

In addition, a technology is known by which eccentricity of an encoder scale member of a rotation encoder is determined. In such a technology, first, an encoder scale material having the geometric center is prepared. Next, the center of the encoder scale material is located at a certain position. Next, the encoder scale member is formed by creating a scale in the encoder scale material. As a result, the center of the scale of the encoder scale member is located at the certain position. In such a technology, here, eccentricity between the above-described geometric center and the above-described certain position is measured (see, for example, Japanese National Publication of International Patent Application No. 2008-539407).

SUMMARY

According to an aspect of the invention, an optical rotary encoder includes a light source that emits light; a rotation body that includes a reflecting diffraction grating, the reflecting diffraction grating including a certain-periodic structure; a light receiving unit that includes a plurality of light receiving elements, each of the plurality of light receiving elements outputs an output signal corresponding to an amount of received light; a synthetic unit that combines output signals output from the plurality of light receiving elements which receive respective lights, the respective lights being emitted from the light source and reflected by the reflecting diffraction grating, the synthetic unit obtaining a signal that is included in the reflected light and represents a fringe pattern component at a certain cycle; and a detection unit that detects a direction based on a first signal and a second signal, the direction being a direction in which a distance between the rotation body and the light receiving unit varies, the first signal and the second signal being obtained by the synthetic unit, the first signal indicating a fringe pattern component having a cycle shorter than the certain cycle, the second signal indicating a fringe pattern component having a cycle longer than the certain cycle.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preliminary Consideration

There are some types of optical rotary encoders having different methods of detecting a rotation angle of a rotation body. As one of the types, an optical rotary encoder is known that uses interference fringes formed by light emitted from a light source and reflected on a reflection diffraction grating that is formed in a rotation body and includes gratings arranged at regular intervals. When the above-described reflected light is received at a plurality of light receiving elements each of which outputs a signal depending on an amount of received light, the encoder of such a type detects the rotation angle of the rotation body by executing shaping processing and interpolation processing on the signal that is output from each of the plurality of light receiving elements.

In such an optical rotary encoder, it is probable that a distance between the rotation body in which the diffraction grating is formed and a light receiving unit that includes the plurality of light receiving elements varies. The variation is caused, for example, by eccentricity of the rotating shaft of the rotation body, a change in the shape of the rotation body and the light receiving unit due to thermal expansion and aging degradation, or the like. When such variation is caused, reduction in a light receiving level of the reflected light in the light receiving element and variation in a pitch of the interference fringes may be caused, so that the detection accuracy of the rotation angle may be reduced.

Here, as a method of reducing variation of the distance between the rotation body and the light receiving unit, there is conceived a method of maximizing a light receiving level of reflected light in the light receiving element, for example, by controlling the position of the light receiving unit. However, in such a method, it is probable that the control position of the light receiving unit when a light receiving level is maximized, is overshot, and that the light receiving unit is vibrated for a while in the vicinity of the control position of the light receiving unit when the light receiving level is maximized. Such a phenomenon is cancelled, for example, by detecting a direction in which the distance between the rotation body and the light receiving unit varies and performing the control depending on the detection result.

Figure 1:
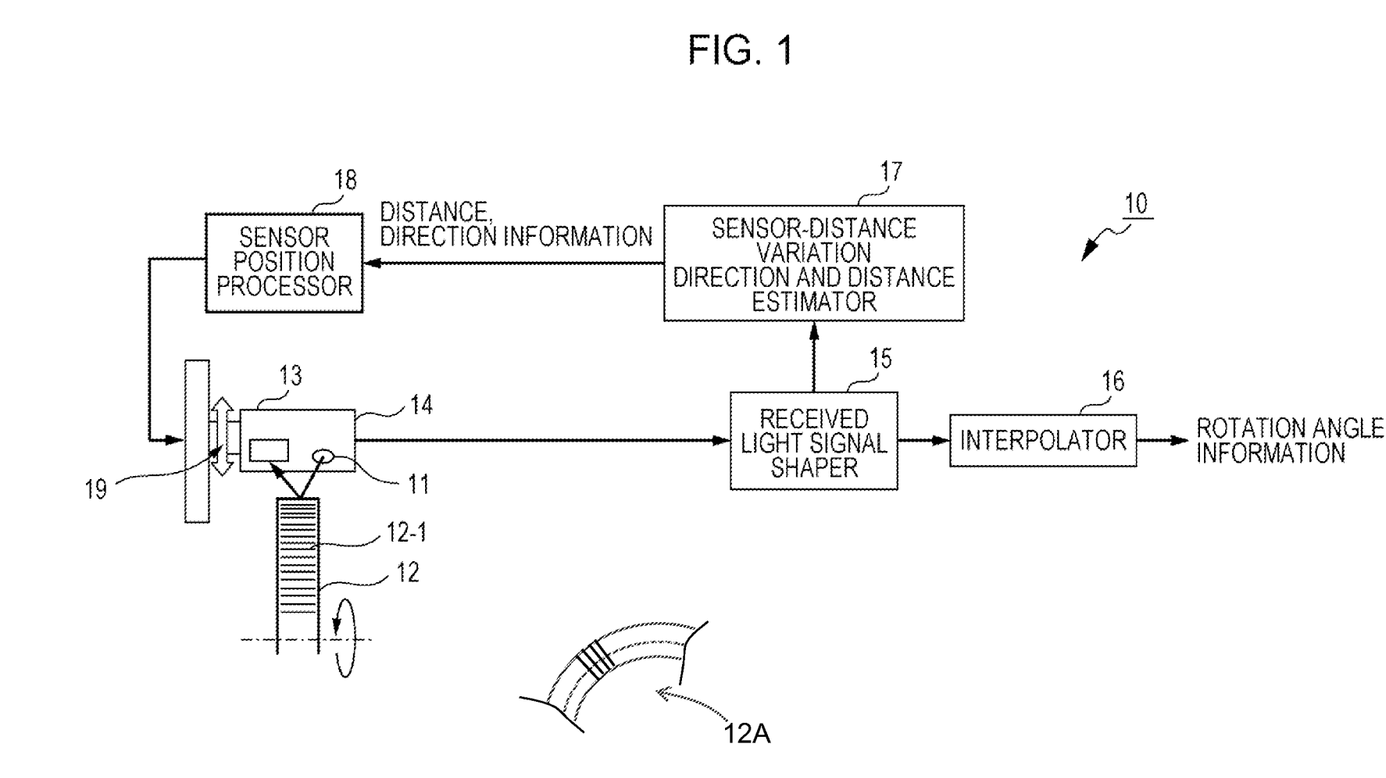
FIG. 1 is a block diagram illustrating a configuration of an optical rotary encoder according to an embodiment.

First, a description is made with reference to FIG. 1. FIG. 1 is a block diagram illustrating a configuration of an optical rotary encoder according to an embodiment. In FIG. 1, an encoder 10 includes a laser diode 11, a scale 12, a photodiode array 13, a light receiving unit 14, a received light signal shaper 15, an interpolator 16, a sensor-distance variation direction and distance estimator 17, a sensor position controller 18, and a micro-piezo actuator 19.

The laser diode 11 is an example of a light source and irradiates the scale 12 with laser light. The scale 12 is an example of a rotation body and includes a diffraction grating 12-1. The diffraction grating 12-1 is a reflection diffraction grating in which gratings are arranged at regular intervals. The scale 12 has a cylindrical shape and uses a cylindrical shaft as a rotating shaft, and the diffraction grating 12-1 is formed so that the gratings are arranged on the side surface of the scale 12 having the cylindrical shape so as to be parallel to the rotating shaft. The scale 12A is a scale which may be used instead of the scale 12. The scale 12A is a circular disk including the diffraction grating 12-1 on a surface. The encoder 10 obtains rotation angle information when the scale 12 is rotated around the rotating shaft. In the embodiment, the diffraction grating 12-1 is configured by a grating pattern using a ¼ of a wavelength of laser light that is emitted from the laser diode 11 as a unit.

The shape of the scale 12 is not limited to the above-described cylindrical shape, and alternatively, for example, the shape of the scale 12 may be a disc-like shape and the diffraction grating 12-1 may be formed so that the gratings are arranged radially at regular intervals on one surface of the disk using the center of the disk as a rotating shaft.

The photodiode array 13 is an example of a light receiving element array, is formed so that a plurality of photodiodes are lined up at regular intervals, and included in the light receiving unit 14. The photodiode is an example of a light receiving element, and outputs an output signal based on an amount of received light when receiving the light.

Figure 2:
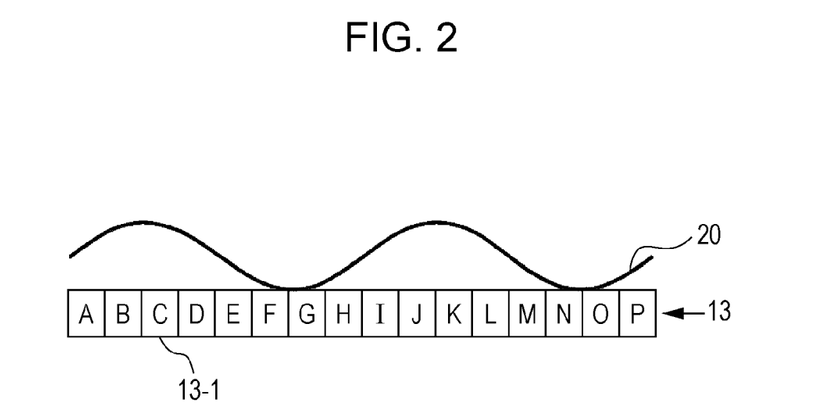
FIG. 2 is a diagram illustrating an example of a relationship between a pitch of interference fringes and an arrangement interval of photodiodes.

In the embodiment, an arrangement interval of photodiodes in the photodiode array 13 is ⅛ of a pitch of interference fringes that are formed at light-receiving positions of the photodiodes by laser light reflected in the diffraction grating 12-1. FIG. 2 illustrates an example of a relationship between a pitch of interference fringes and an arrangement interval of photodiodes. In FIG. 2, a waveform 20 indicates the strength of reflected light from the diffraction grating 12-1 at an arrangement position of the photodiode array 13, and the length of one cycle of the waveform 20 indicates a pitch of interference fringes. In addition, characters of A, B, C, . . . , and P illustrated in FIG. 2 respectively indicate 16 photodiodes 13-1. That is, in the example of FIG. 2, the 16 photodiodes 13-1 are arranged in the length that corresponds to two cycles of the waveform 20, that is, eight photodiodes 13-1 are arranged for a pitch of interference fringes.

The received light signal shaper 15 is an example of a combining unit, and obtains a signal that indicates a fringe pattern component of a certain cycle, which is included in reflected laser light. The received light signal shaper 15 obtains the signal by combining output signals that are output from the plurality of photodiodes 13-1 of the photodiode array 13 which receive the light emitted from the laser diode 11 and reflected on the diffraction grating 12-1.

The interpolator 16 obtains rotation angle information of the scale 12 on the basis of the signal that indicates the fringe pattern, that is, the signal that indicates the interference fringes generated at the light-receiving positions of the plurality of photodiode 13-1 by the diffraction grating 12-1, out of reflected laser light that is obtained by the received light signal shaper 15.

A method of obtaining rotation angle information of the scale 12, which is performed in the encoder 10 in FIG. 1, is described below. When a photodiode array illustrated in FIG. 2 is used as the photodiode array 13, the received light signal shaper 15 performs combining of signals, which is represented by the following two equations, and obtains a set of two signals $S_{sine}$ and $S_{cosine}$ the cycles of which are shifted by ¼, for the waveform 20 of the interference fringes.

$$S_{sine} = \{(A+B+C+D)-(E+F+G+H)\}+\{(I+J+K+L)-(M+N+O+P)\} \quad [1]$$

$$S_{cosine} = \{(C+D+E+F)-(G+H+I+J)\}+\{(K+L+M+N)-(O+P+A+B)\} \quad [2]$$

In the above-described equation [1] and equation [2], the characters of A, B, C, . . . , and P represent signals that are respectively output from the 16 photodiodes 13-1, and the sizes of which correspond to amounts of the received light.

The interpolator 16 obtains rotation angle information $P_{os}$ of the scale 12 by calculating the following equation [3] for the set of signals $S_{sine}$ and $S_{cosine}$ that are output from the received light signal shaper 15.

$$P_{os}=\tan^{-1}(S_{sine}/S_{cosine}) \quad [3]$$

Figure 3:
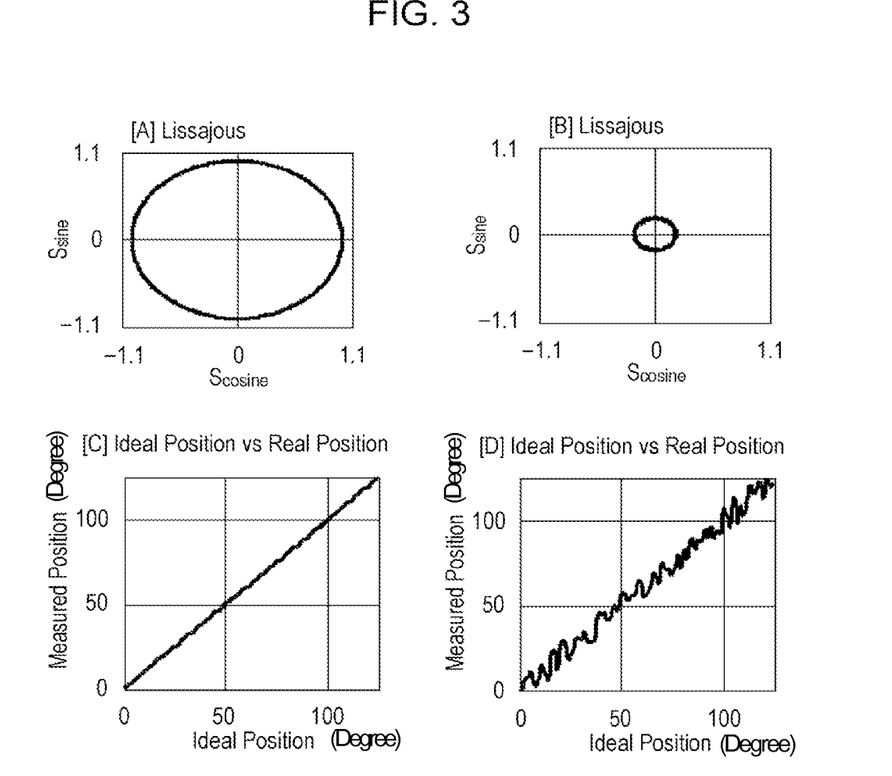
FIG. 3 is a diagram illustrating a relationship between deviation of a distance from a light receiving unit to a scale, and accuracy of angle information.

A relationship between deviation of a distance from the light receiving unit 14 to the scale 12 and accuracy of angle information is described below with reference to FIG. 3. In FIG. 3, [A] and [B] illustrate examples of a Lissajous curve that is drawn using an output of the received light signal shaper 15. The Lissajous curves are drawn so that the signal $S_{sine}$ that is obtained by combination using the above-described equation [1] is set to the vertical axis, and a signal $S_{cosine}$ that is obtained by combination using the above-described equation [2] is set to the horizontal axis. In addition, [C] and [D] illustrate examples of a graph in which an actual rotation angle of the scale 12 and the result of a rotation angle of the scale 12 obtained by the encoder 10 are associated with each other. In the graphs, the horizontal axis indicates the actual rotation angle of the scale 12, and the vertical axis indicates the result of a rotation angle of the scale 12 obtained by the encoder 10.

In FIG. 3, [A] and [C] indicate a case in which a distance between the light receiving unit 14 and the scale 12 is appropriate. For example, when an arrangement interval of the photodiodes 13-1 in the photodiode array 13 and a cycle of the waveform 20 of the interference fringes have the relationship illustrated in FIG. 2, the distance between the light receiving unit 14 and the scale 12 is appropriate. In this case, the area that is enclosed by the Lissajous curve is large, and the relationship between the actual rotation angle and the result of a rotation angle obtained by the encoder 10 has a proportional relationship, so that the detection accuracy is excellent.

On the other hand, in FIG. 3, [B] and [D] indicate a case in which the distance between the light receiving unit 14 and the scale 12 is deviated from the appropriate distance. In this case, the relationship between an arrangement interval of the photodiodes 13-1 in the photodiode array 13 and a cycle of the waveform 20 of the interference fringes is not appropriate, so that the area that is enclosed by the Lissajous curve is small. Therefore, it is indicated that a detection level of a signal that represents the interference fringes is reduced. In addition, in this case, monotonicity of the relationship between the actual rotation angle and the result of the rotation angle obtained by the encoder 10 is greatly reduced, so that the detection accuracy is reduced.

The sensor-distance variation direction and distance estimator 17, the sensor position controller 18, and the micro-piezo actuator 19 that are described later detect a direction of deviation from the appropriate value of the distance between the light receiving unit 14 and the scale 12 and move the light receiving unit 14 in a direction that is opposite to the detected direction to set the distance appropriately.

The received light signal shaper 15 may include a prefilter that removes a signal component such as noise that obviously does not correspond to an amount of received light, from signals that are output from the photodiodes 13-1.

In addition, the interpolator 16 may obtain the rotation angle information $P_{os}$ from a set of signals $S_{sine}$ and $S_{cosine}$ with reference to a table that is prepared beforehand and indicates a relationship between a set of signals $S_{sine}$ and $S_{cosine}$ and the rotation angle information $P_{os}$, instead of calculation of the above-described equation [3]. That is, for example, a look-up table of the rotation angle information $P_{os}$ using a set of signals $S_{sine}$ and $S_{cosine}$ as an address input may be prepared in a memory beforehand, and the interpolator 16 may obtain the rotation angle information $P_{os}$ using the look-up table.

The sensor-distance variation direction and distance estimator 17 is described below. The sensor-distance variation direction and distance estimator 17 is an example of a detection unit and detects a direction in which the distance between the scale 12 and the light receiving unit 14 varies. The sensor-distance variation direction and distance estimator 17 performs such detection on the basis of two signals that are obtained by the received light signal shaper 15. A first signal that is one of the two signals indicates a fringe pattern having a cycle that is shorter than that of interference fringes that are generated at the light-receiving positions of the plurality of photodiodes 13-1 by the diffraction grating 12-1. In addition, a second signal that is the other signal of the two signals indicates a fringe pattern having a cycle that is longer than that of the interference fringes.

Figure 4:
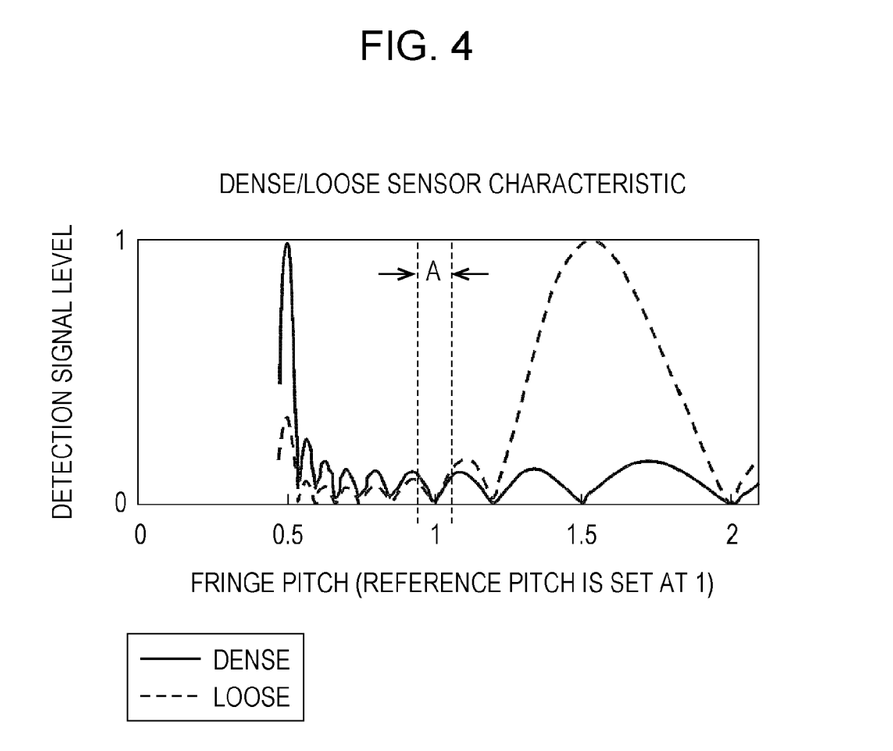
FIG. 4 is a diagram illustrating a relationship between a pitch of a fringe pattern component and a detection level of a signal that represents the fringe pattern component.

A method of detecting a direction in which the distance between the scale 12 and the light receiving unit 14 varies, by the sensor-distance variation direction and distance estimator 17, is described below. First, a description is made with reference to FIG. 4. FIG. 4 illustrates a relationship between a pitch of a fringe pattern component that is included in reflected light received in the photodiode array 13 and a detection level of a signal that represents the fringe pattern component.

In FIG. 4, the horizontal axis indicates a pitch of fringe pattern line segments when a reference pitch is set at 1. The reference pitch is a pitch of a fringe pattern component, that is, a pitch of the interference fringes that are formed by the diffraction grating 12-1, where the arrangement interval of the photodiodes 13-1 is assumed as a reference. In addition, the arrangement interval of the photodiodes 13-1, which is set using such a pitch of the interference fringes as a reference is referred to as "standard interval".

In addition, in FIG. 4, the vertical axis indicates a detection level of a signal that represents the fringe pattern component. A detection level "Level" of a signal that represents the fringe pattern component is obtained by calculating the following equation [4] using values of a set of signals $S_{sine}$ and $S_{cosine}$ that are output from the received light signal shaper 15.

$$\text{Level}=(S_{sine}^2+S_{cosine}^2)^{1/2} \quad [4]$$

In FIG. 4, the curve of the solid line indicates a detection level of a signal that represents a fringe pattern component when the photodiode array 13 is used in which the arrangement interval of the photodiodes 13-1 is ½ of the standard interval. In a description described below, such an arrangement interval of the photodiodes 13-1 in the photodiode array 13 is referred to as "dense interval". Such a curve of the solid line indicates that a detection level of a signal that represents a fringe pattern component when the pitch is 0.5 is maximum while a detection level of a signal that represents a fringe pattern component, that is, interference fringes when the pitch is 1.0 is minimum.

In addition, in FIG. 4, the curve of the broken line indicates a detection level of a signal when the photodiode array 13 is used in which the arrangement interval of the photodiodes 13-1 is 3/2 of the standard interval. In a description described below, such an arrangement interval of the photodiodes 13-1 in the photodiode array 13 is referred to as "loose interval". The curve of the broken line indicates that a detection level of a signal that represents a fringe pattern component when the pitch is 1.5 is maximum while a detection level of a signal that represents a fringe pattern component, that is, interference fringes when the pitch is 1.0 is minimum.

Figure 5:
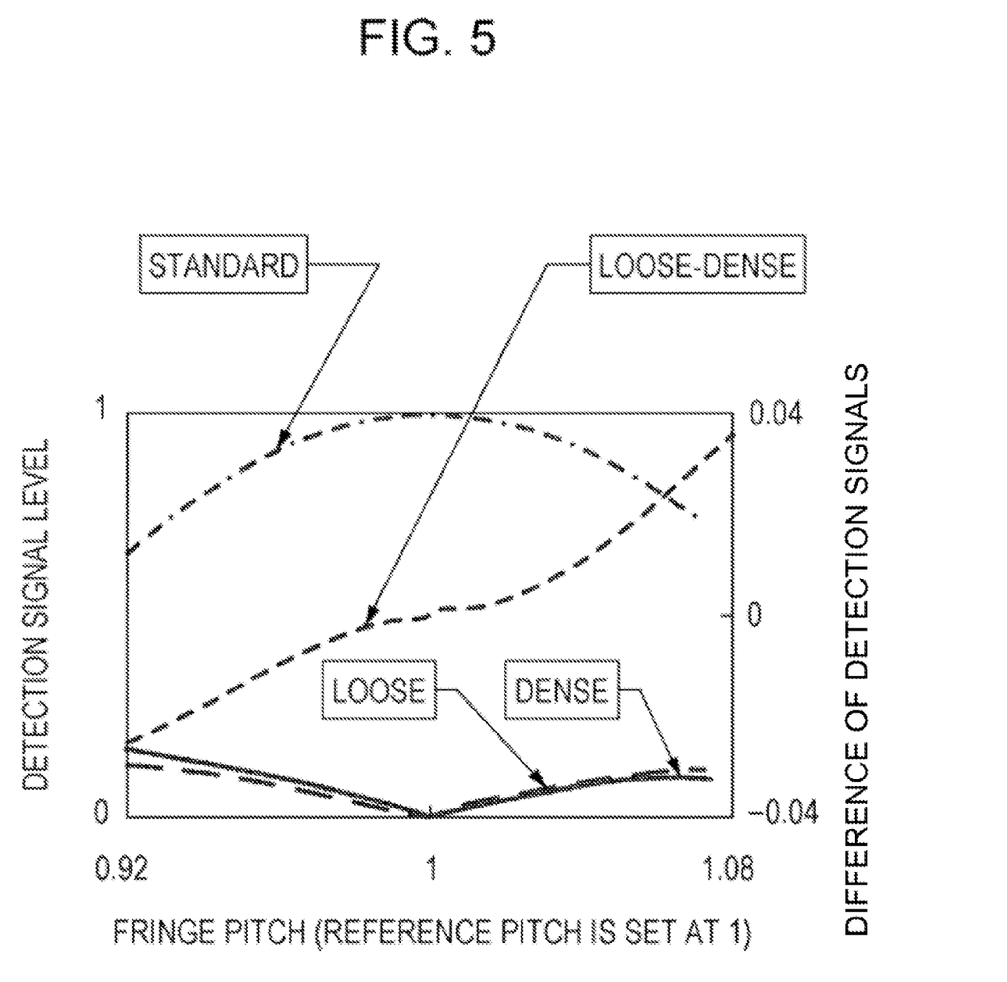
FIG. 5 is an enlarged view of a portion of FIG. 4.

In FIG. 4, a portion is described in which the pitch of the fringe pattern component is around "1", that is, a portion in the vicinity of a pitch of interference fringes, which is represented by a symbol A in FIG. 4. FIG. 5 is an enlarged view of the portion of the symbol A in FIG. 4.

In FIG. 5, in an area in which the pitch of the fringe pattern component is more than "1", when the photodiode array 13 of the loose interval that is indicated by the broken line is used, a detection level of a signal that represents the fringe pattern component is large as compared with a case of using the dense interval that is indicated by the solid line. On the other hand, in an area in which a pitch of the fringe pattern component is less than "1", when the photodiode array 13 of the loose interval that is indicated by the broken line is used, a detection level of a signal that represents the fringe pattern component is small as compared with a case of using the dense interval that is indicated by the solid line.

In FIG. 5, the curve that is indicated by the dotted line indicates a result obtained by subtracting the detection level of the signal that represents the fringe pattern component when the photodiode array 13 of the dense interval is used, from the detection level of the signal that represents the fringe pattern component when the photodiode array 13 of the loose interval is used.

Here, a case in which the subtraction result is positive indicates a case in which the detection level of the signal that represents the fringe pattern component when the photodiode array 13 of the loose interval is used is larger than the detection level of signals that represent the fringe pattern component when the photodiode array 13 of the dense interval is used, that is, it is indicated that the distance between the scale 12 and the light receiving unit 14 is larger than the appropriate value. On the other hand, a case in which the subtraction result is negative indicates a case in which the detection level of the signal that represents the fringe pattern component when the photodiode array 13 of the dense interval is used is larger than the detection level of the signal that represents the fringe pattern component when the photodiode array 13 of the loose interval is used, that is, it is indicated that the distance between the scale 12 and the light receiving unit 14 is smaller than the appropriate value. Thus, when the positive or negative of the subtraction result is determined, the direction in which the distance between the scale 12 and the light receiving unit 14 varies may be detected.

As described above, the sensor-distance variation direction and distance estimator 17 detects the direction in which the distance between the scale 12 and the light receiving unit 14 varies. The curve of the dashed line in FIG. 5 indicates a detection level of a signal that represents interference fringes when the photodiode array 13 of the standard interval is used and indicates that the detection level is maximum for the signal that represents the fringe pattern component, that is, the interference fringes when the pitch is 1.

As described below with reference to FIG. 6, in the encoder 10 according to the embodiment, a detection level of a signal that represents a fringe pattern component is obtained similar to a case of using the photodiode arrays 13 having a different arrangement interval of the photodiodes 13-1.

First, in the embodiment, the photodiode array 13 in which 24 photodiodes 13-1 are arranged at regular intervals is used. Output signals of the photodiodes 13-1 that constitute the photodiode array 13 are respectively set as A, B, C, ..., and X as illustrated in [A] of FIG. 6.

Figure 6:
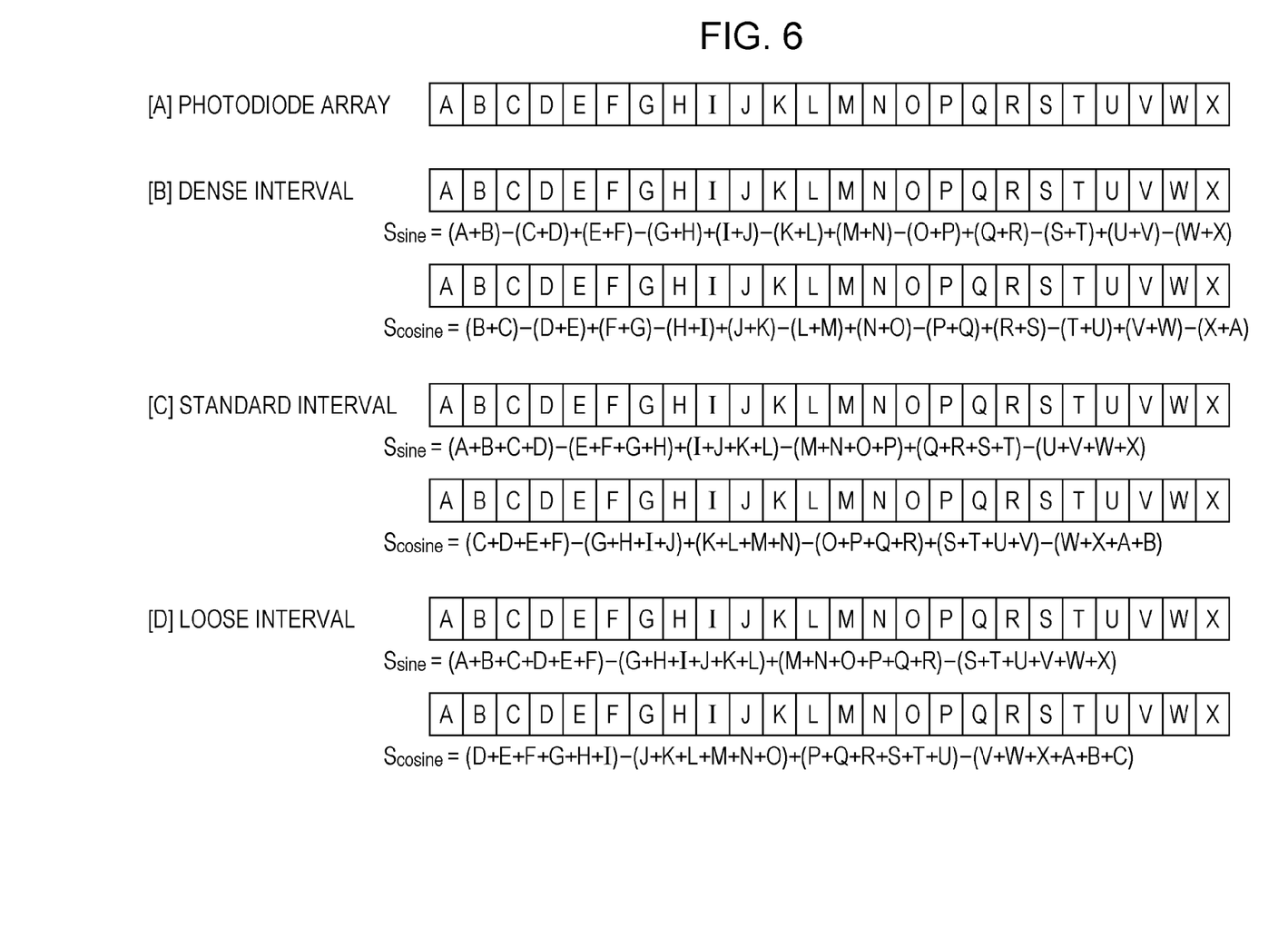
FIG. 6 is an example illustrating a method of obtaining a detection level of a signal that represents a fringe pattern component, similar to a case in which a photodiode array having a different arrangement interval of photodiodes is used.

In this case, as illustrated in [C] of FIG. 6, the received light signal shaper 15 performs combining of signals, which is represented by the following two equations, and obtains a set of two signals $S_{sine}$ and $S_{cosine}$ the cycles of which are shifted by ¼, for a waveform that indicates interference fringes.

$$S_{sine}=(A+B+C+D)-(E+F+G+H)+(I+J+K+L)-(M+N+O+P)+(Q+R+S+T)-(U+V+W+X) \quad [5]$$

$$S_{cosine}=(C+D+E+F)-(G+H+I+J)+(K+L+M+N)-(O+P+Q+R)+(S+T+U+V)-(W+X+A+B) \quad [6]$$

Here, the sensor-distance variation direction and distance estimator 17 performs calculation by assigning values of the set of signals $S_{sine}$ and $S_{cosine}$ that are obtained by the received light signal shaper 15 as described above, to the above-described equation [4]. The value "Level" that is obtained by such calculation indicates a detection level of a signal that represents the fringe pattern component, that is, the interference fringes when the photodiode array 13 of the standard interval is used.

In addition, as illustrated in [B] of FIG. 6, the received light signal shaper 15 performs combining of signals, which is represented by the following two equations and obtains a set of two signals $S_{sine}$ and $S_{cosine}$ the cycles of which are shifted by ¼, for a waveform that indicates a fringe pattern component having a cycle that is ½ of that of the interference fringes.

$$S_{sine}=(A+B)-(C+D)+(E+F)-(G+H)+(I+J)-(K+L)+(M+N)-(O+P)+(Q+R)-(S+T)+(U+V)-(W+X) \quad [7]$$

$$S_{cosine}=(B+C)-(D+E)+(F+G)-(H+I)+(J+K)-(L+M)+(N+O)-(P+Q)+(R+S)-(T+U)+(V+W)-(X+A) \quad [8]$$

Here, the sensor-distance variation direction and distance estimator 17 performs calculation by assigning values of the set of the signals $S_{sine}$ and $S_{cosine}$ that are obtained by the received light signal shaper 15 as described above, to the above-described equation [4]. The value "Level" that is obtained by such calculation indicates a detection level of a signal that represents the fringe pattern component when the photodiode array 13 of the dense interval is used.

In addition, as illustrated in [D] of FIG. 6, the received light signal shaper 15 performs combining of signals, which is represented by the following two equations and obtains a set of two signals $S_{sine}$ and $S_{cosine}$ the cycles of which are shifted by ¼, for a waveform that indicates a fringe pattern component having a cycle that is 3/2 of that of the interference fringes.

$$S_{sine}=(A+B+C+D+E+F)-(G+H+I+J+K+L)+(M+N+O+P+Q+R)-(S+T+U+V+W+X) \quad [9]$$

$$S_{cosine}=(D+E+F+G+H+I)-(J+K+L+M+N+O)+(P+Q+R+S+T+U)-(V+W+X+A+B+C) \quad [10]$$

Here, the sensor-distance variation direction and distance estimator 17 performs calculation by assigning values of the set of the signals $S_{sine}$ and $S_{cosine}$ that are obtained by the received light signal shaper 15 as described above, to the above-described equation [4]. The value "Level" that is obtained by such calculation indicates a detection level of a signal that represents the fringe pattern component when the photodiode array 13 of the loose interval is used.

As describe above, the encoder 10 according to the embodiment obtains a detection level of a signal that represents a fringe pattern component similar to a case of using the photodiode arrays 13 having a different arrangement interval of the photodiodes 13-1. Generally, as described below, a detection level of a signal that represents a fringe pattern component may be obtained.

First, "n" is set as a natural number the value of which is selected depending on a pitch of the fringe pattern component that is a detection target. In this case, output signals of the photodiodes 13-1 that are lined up in the photodiode array 13 are set into groups of 4n in the column order of the photodiodes 13-1 in the photodiode array 13.

First, the received light signal shaper 15 obtains the addition total in all of the groups for the first output signal to the 2n-th output signal in the column order of the photodiodes 13-1. The total is referred to as "first total".

Next, the received light signal shaper 15 obtains the addition total in all of the groups for the 2n+1-th output signal to the 4n-th output signal in the column order of the photodiodes 13-1. The total is referred to as "second total".

Here, the received light signal shaper 15 obtains a difference value that is obtained by subtracting the second total from the first total. The difference value is the above-described signal $S_{sine}$.

Next, the received light signal shaper 15 obtains the addition total in all of the groups for the n+1-th output signal to the 3n-th output signal in the column order of the photodiodes 13-1. The total is referred to as "third total".

Next, the received light signal shaper 15 obtains the addition total in all of the groups for the first output signal to the n-th output signal, and the 3n+1-th output signal to the 4n-th output signal in the column order of the photodiodes 13-1. The total is referred to as "fourth total".

Here, the received light signal shaper 15 obtains a difference value that is obtained by subtracting the fourth total from the third total. The difference value is the above-described signal $S_{cosine}$.

In the above-described procedure, when the value of "n" is "2", the procedure is performed by the received light signal shaper 15 to calculate the above-described equation [5] and equation [6], that is, to obtain a detection level of a signal that represents the interference fringes. In addition, when the value of "n" is "1", the procedure is performed by the received light signal shaper 15 to calculate the above-described equation [7] and equation [8], that is, to obtain a detection level of a signal that represents the fringe pattern component when the photodiode array 13 of the dense interval is used. In addition, when the value of "n" is "3", the procedure is performed by the received light signal shaper 15 to calculate the above-described equation [9] and equation [10], that is, to obtain a detection level of a signal that represents the fringe pattern component when the photodiode array 13 of the loose interval is used.

After that, as described above, the sensor-distance variation direction and distance estimator 17 performs calculation by assigning the values of the set of signals $S_{sine}$ and $S_{cosine}$ that are obtained by the received light signal shaper 15, to the above-described equation [4]. The value "Level" that is obtained by such calculation indicates the detection level of the signal that represents the fringe pattern component. The encoder 10 may be configured as described above.

The other configuration elements of the encoder 10 are described below. The sensor position controller 18 controls the micro-piezo actuator 19 on the basis of the detection result of the direction in which the distance between the scale 12 and the light receiving unit 14 varies and moves the light receiving unit 14 in a direction that is opposite to the direction to suppress the variation of the distance. In addition, the sensor position controller 18 controls the micro-piezo actuator 19 and terminates the movement of the light receiving unit 14 when the detected distance between the scale 12 and the light receiving unit 14 represents the appropriate value. The sensor position controller 18 is an example of a control unit.

The micro-piezo actuator 19 is, for example, a piezo element, a voice coil motor (VCM), or the like, and moves the light receiving unit 14 in response to a control signal that is transmitted from the sensor position controller 18 to vary the distance between the light receiving unit 14 and the scale 12. The encoder 10 includes the above-described configuration elements.

Figure 7:
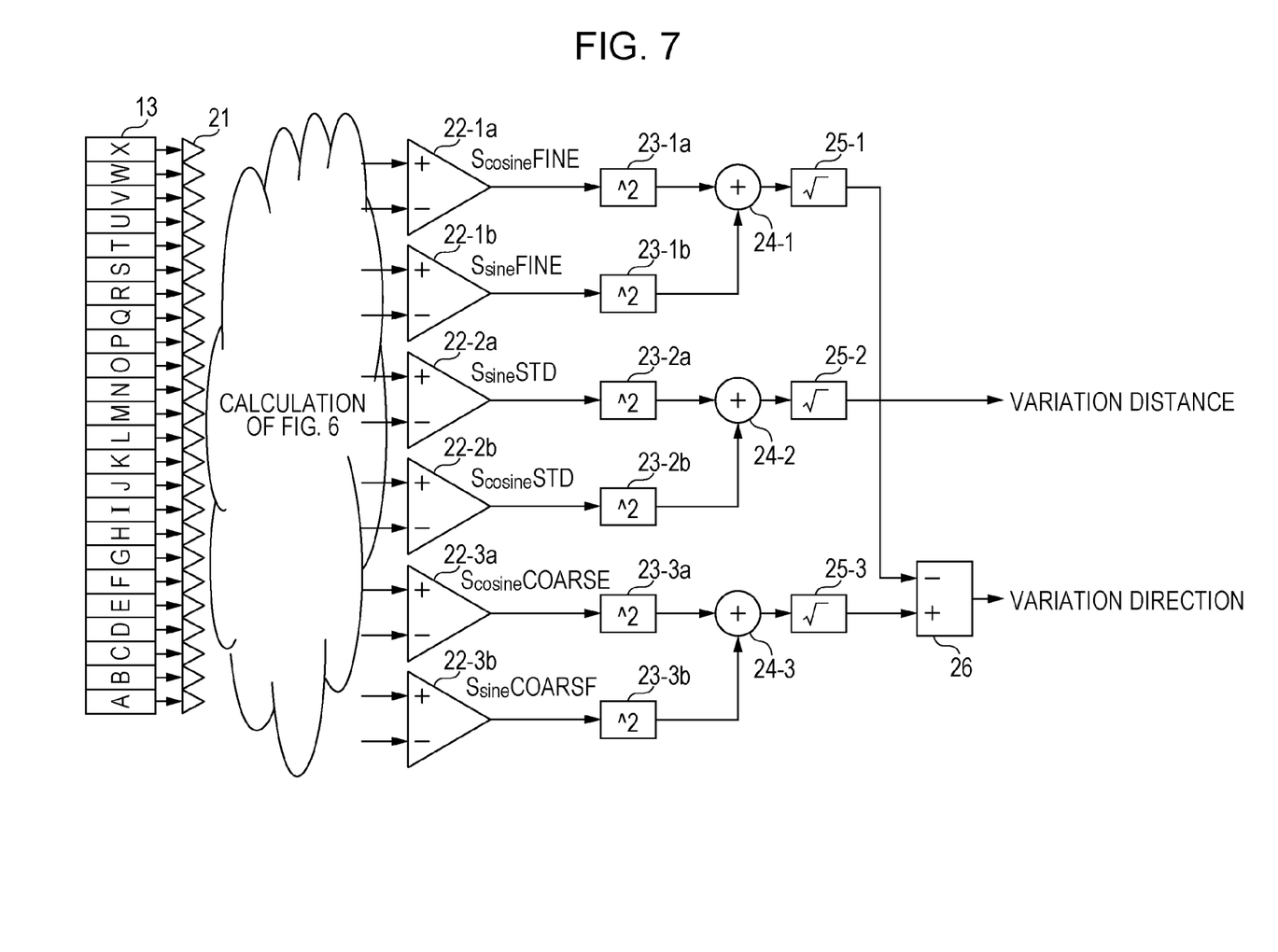
FIG. 7 is a specific circuit configuration example of a received light signal shaper and a sensor-distance variation direction and distance estimator.

A description is made with reference to FIG. 7 below. FIG. 7 is a diagram illustrating a specific circuit configuration example of the received light signal shaper 15 and the sensor-distance variation direction and distance estimator 17. In the configuration example of FIG. 7, the received light signal shaper 15 includes a buffer 21 and calculation amplifiers 22-1a to 22-3b. In addition, the sensor-distance variation direction and distance estimator 17 includes square calculation circuits 23-1a to 23-3b, adders 24-1 to 24-3, square root calculation circuits 25-1 to 25-3, and a subtraction circuit 26.

The output signals of the photodiodes 13-1 that constitute the photodiode array 13 are calculated as illustrated in FIG. 6 after passing through the buffer 21, that is, addition and subtraction are performed on the output signals as represented by the above-described equations [5] to [10]. The calculation amplifiers 22-1a to 22-3b are used for such addition and subtraction of the signals. Here, the calculation amplifier 22-1a is used for the equation [7], and the calculation amplifier 22-1b is used for the equation [8]. In addition, the calculation amplifier 22-2a is used for the equation [5], and the calculation amplifier 22-2b is used for the equation [6]. In addition, the calculation amplifier 22-3a is used for the equation [9], and the calculation amplifier 22-3b is used for the equation [10].

A circuit that is obtained by combining the square calculation circuits 23-1a to 23-3b, the adders 24-1 to 24-3, and the square root calculation circuits 25-1 to 25-3 is a circuit that performs calculation of the above-described equation [4].

The square calculation circuits 23-1a to 23-3b output signals that are obtained by squaring the output signals of the calculation amplifiers 22-1a to 22-3b, respectively.

The adder 24-1 outputs a signal that is obtained by combining the output signals of the two square calculation circuits 23-1a and 23-1b. That is, the adder 24-1 outputs a signal that is obtained by squaring and combining the output signals of the calculation amplifiers 22-1a and 22-1b. In addition, the square root calculation circuit 25-1 performs square root calculation on the output signal of the adder 24-1 and outputs the resultant signal.

The adder 24-2 outputs a signal that is obtained by combining output signals of the two square calculation circuits 23-2a and 23-2b. That is, the adder 24-2 outputs a signal that is obtained by squaring and combining the output signals of the calculation amplifiers 22-2a and 22-2b. In addition, the square root calculation circuit 25-2 performs square root calculation on the output signal of the adder 24-2 and outputs the resultant signal. The size of the output signal of the square root calculation circuit 25-2 corresponds to the distance between the scale 12 and the light receiving unit 14.

The adder 24-3 outputs a signal that is obtained by combining output signals of the two square calculation circuits 23-3a and 23-3b. That is, the adder 24-3 outputs a signal that is obtained by squaring and combining the output signals of the calculation amplifiers 22-3a and 22-3b. In addition, the square root calculation circuit 25-3 performs square root calculation on the output signal of the adder 24-3 and outputs the resultant signal.

The subtraction circuit 26 subtracts the output signal of the square root calculation circuit 25-1 from the output signal of the square root calculation circuit 25-3, and outputs the resultant signal. When the output signal of the subtraction circuit 26 is positive, it is indicated that the distance between the scale 12 and the light receiving unit 14 is larger than the appropriate value. On the other hand, when the output signal of the subtraction circuit 26 is negative, it is indicated that the distance between the scale 12 and the light receiving unit 14 is smaller than the appropriate value.

In the configuration of FIG. 7, the direction in which the distance between the scale 12 and the light receiving unit 14 varies is determined by the positive or negative sign of the output signal of the subtraction circuit 26, and the size of the output signal is not used to determine the direction. Therefore, the square root calculation circuits 25-1 and 25-3 may be removed from the configuration of FIG. 7. That is, the subtraction circuit 26 may subtract the output signal of the adder 24-1 from the output signal of the adder 24-3 and output the resultant signal. Even in such a configuration, the direction in which the distance between the scale 12 and the light receiving unit 14 varies may be appropriately determined on the basis of the positive or negative sign of the output signal of the subtraction circuit 26.

In addition, in the configuration of FIG. 7, the received light signal shaper 15 and the sensor-distance variation direction and distance estimator 17 are realized by an analog signal processing circuit. Alternatively, for example, the received light signal shaper 15 and the sensor-distance variation direction and distance estimator 17 may be realized by a digital signal processing circuit by converting the output signals of the photodiodes 13-1 that constitute the photodiode array 13 to digital data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical rotary encoder comprising:
   a light source that emits light;
   a rotation body that includes a reflecting diffraction grating, the reflecting diffraction grating including a certain-periodic structure;
   a light receiving unit that includes a plurality of light receiving elements, each of the plurality of light receiving elements outputs an output signal corresponding to an amount of received light;
   a synthetic unit that combines output signals output from the plurality of light receiving elements which receive respective lights, the respective lights being emitted from the light source and reflected by the reflecting diffraction grating, the synthetic unit obtaining a signal that is included in the reflected light and represents a fringe pattern component at a certain cycle; and
   a detection unit that detects a direction based on a first signal and a second signal, the direction being a direction in which a distance between the rotation body and the light receiving unit varies, the first signal and the second signal being obtained by the synthetic unit, the first signal indicating a fringe pattern component having a cycle shorter than the certain cycle, the second signal indicating a fringe pattern component having a cycle longer than the certain cycle.

2. The optical rotary encoder according to claim 1, wherein the light receiving unit includes a light receiving element array in which the plurality of light receiving elements are lined up at regular intervals,
   when n is a natural number a value of which is selected depending on the certain cycle, the combining unit sets the output signals of the plurality of light receiving elements into groups of 4n in column order of the plurality of light receiving elements in the light receiving element array, obtains a difference value by subtracting a total in all of the groups for a 2n+1-th output signal to a 4n-th output signal of the column order, from a total in all of the groups for a first output signal to a 2n-th output signal of the column order, obtains a difference value by subtracting a total in all of the groups for the first output signal to an n-th output signal and a 3n+1-th output signal to the 4n-th output signal of the column order, from a total in all of the groups for an n+1-th output signal to a 3n-th output signal of the column order, and obtains a signal that indicates a level of the fringe pattern component at the certain cycle based on the obtained two difference values.

3. The optical rotary encoder according to claim 2, wherein the detection unit detects the direction based on difference between the first signal obtained by the combining unit when the value of n is set as a first value and the second signal obtained by the combining unit when the value of n is set as a second value that is greater than the first value.

4. The optical rotary encoder according to claim 1, further comprising:
   a control unit that changes the distance based on a detection result by the detection unit and suppresses a variation in the distance.

5. An optical rotary encoder comprising:
   a light source that emits light;
   a circular disk that includes a reflecting diffraction grating, the reflecting diffraction grating including a certain-periodic structure;
   a light receiving unit that includes a plurality of light receiving elements, each of the plurality of light receiving elements outputs an output signal corresponding to an amount of received light;
   a synthetic unit that combines output signals output from the plurality of light receiving elements which receive respective lights, the respective lights being emitted from the light source and reflected by the reflecting diffraction grating, the synthetic unit obtaining a signal that is included in the reflected light and represents a fringe pattern component at a certain cycle; and
   a detection unit that detects a direction based on a first signal and a second signal, the direction being a direction in which a distance between the rotation body and the light receiving unit varies, the first signal and the second signal being obtained by the synthetic unit, the first signal indicating a fringe pattern component having a cycle shorter than the certain cycle, the second signal indicating a fringe pattern component having a cycle longer than the certain cycle.

6. A correction method for an optical rotary encoder, the correction method comprising:
   combining output signals that correspond to amounts of light received and that are output from a plurality of light receiving elements which receive light emitted from a light source and reflected on a reflection diffraction grating that is formed in a rotation body and in which gratings are arranged at regular intervals, and obtaining a first signal that represents a fringe pattern component having a cycle shorter than a cycle of interference fringes generated at light-receiving positions of the plurality of light receiving elements by the diffraction grating, and a second signal that represents a fringe pattern component having a cycle longer than the cycle of the interference fringes;

detecting a direction in which a distance between the rotation body and a light receiving unit that includes the plurality of light receiving elements varies, based on the first signal and the second signal; and changing the distance based on a detection result of the direction and suppressing variation in the distance.

* * * * *